April 27, 1937.   C. LUZ   2,078,579
FILM SPOOL AND DEVELOPING TANK
Filed April 2, 1936   2 Sheets-Sheet 1
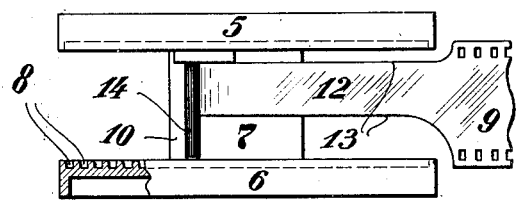
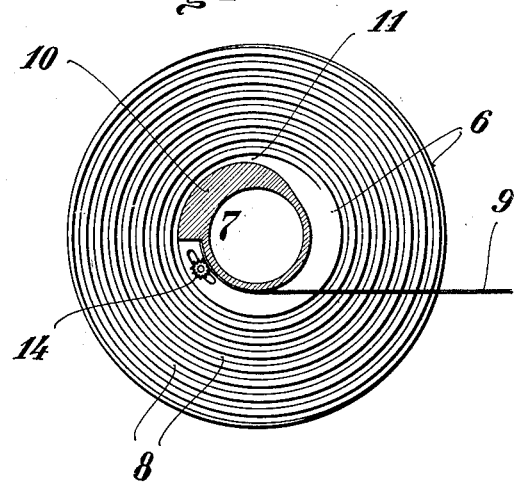
Christian Luz
INVENTOR
BY
ATTORNEY April 27, 1937.  C. LUZ  2,078,579
FILM SPOOL AND DEVELOPING TANK
Filed April 2, 1936  2 Sheets-Sheet 2
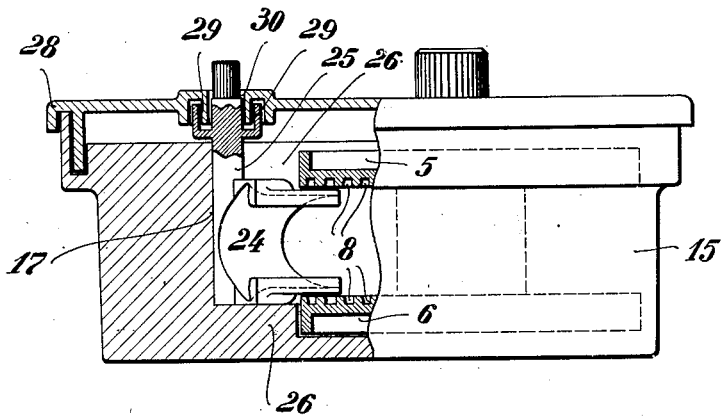
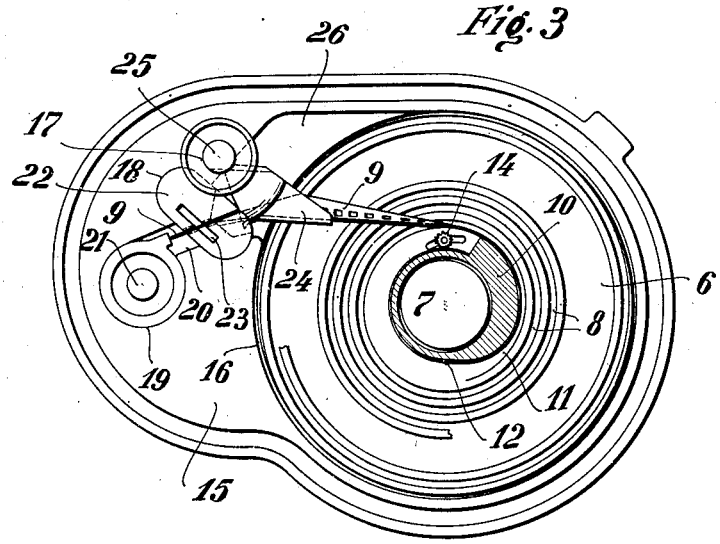
Christian Luz
INVENTOR
BY
*Joan E. A. Konigsberg*
ATTORNEY Patented Apr. 27, 1937

2,078,579

UNITED STATES PATENT OFFICE 2,078,579

FILM SPOOL AND DEVELOPING TANK

Christian Luz, Wetzlar, Germany, assignor to Ernst Leitz, G. m. b. H., Wetzlar, Germany Application April 2, 1936, Serial No. 72,228
In Germany April 23, 1935

4 Claims. (Cl. 95—90.5)

This invention relates to improvements in film spools and film developing tanks of the type in which the film is wound spirally upon the spool and placed in the tank to be developed. The object of the invention is to provide an improved film spool and developing tank therefor embodying certain novel features of construction and operation whereby to provide a more efficient apparatus and eliminate certain disadvantages inherent in prior art disclosures. In the accompanying drawings illustrating the invention:

Fig. 1 is a side view of the improved film spool with parts in section.

Fig. 2 is a plan view thereof with parts broken away.

Fig. 3 is a plan view of the developing tank containing the film spool shown in Figures 1 and 2.

Fig. 4 is a detail view partly in section of portions of the tank shown in Figure 3.

Referring to Figures 1 and 2 the film spool consists of two disks 5 and 6 connected by a hub 7. The disks are provided with spiral grooves 8 adapted to receive the windings of the film 9 in a well known manner. The spool hub 7 is provided with a cam 10 for guiding the leading end of the film into the beginning or entrance 11 of the grooves 8. The leading end of the film is cut as shown in Figure 1 to form a tongue or leading portion 12, the edges 13 of which lie between the perforations in the film. The tongue 12 of the film is placed against the hub 7 between the latter and a holding member 14 in the form of a knurled or ribbed roller which pinches the film against the hub in an obvious manner. The distance between the bottoms of the grooves 8 in the opposed disks 5 and 6 is less than the width of the film.

In operation the leading tongue of the film is inserted between the hub 7 and the holding member 14 and thereafter the spool is rotated, the film coming from a film cartridge or casette. As the spool is rotated the cam 10 engages the film and guides it into the spiral grooves in the usual manner. The construction embodies the advantage that no part of the spool engages the film but that the latter is guided safely and without friction into the grooves. Thus a film having no interwound paper strip or other protecting means may be safely wound for developing purposes, the operation of course taking place in a dark room.

Figure 3 shows the film spool placed in the developing tank, the cover of the latter being removed. The tank 15 is provided with a large recess 16 to receive the spool 5—6 and smaller recesses 17, 18, and 19, there being also a film canal 20 connecting the recesses 18 and 19. The latter is adapted to receive the film cartridge 21 from which the film is led through a suitable cutting mechanism 22 of known construction having a knife 23 and thence to the spool and attached at 14. The film guiding means 24 is at this time positioned in the recess 26 by rotation of the shaft 25. After the film has been attached to the spool, the guiding means are swung back into the position shown and the film curved slightly transversely so as to engage the grooves 8 as will be understood. Then the tank is closed and the developing may be done.

Inasmuch as the distance between the bottoms of the grooves in the two spool disks is less than the width of the film it follows that the film must be curved slightly transversely in order that the edges may properly engage the grooves. As will be seen from Figure 4 the guiding means 24 is adapted to curve or bend the film for the purpose explained. Figure 3 shows the position of the film as it leaves the guiding mechanism and passes into the spool.

The guiding mechanism 24 is operated by its shaft 25 which turns in the recess 17 in the tank. The shaft extends through the cover 28 so that the mechanism may be operated with the tank closed. A suitable packing 29 is provided to exclude light which might enter the tank through the opening 30 in the cover. It is a feature of the invention that the cutting and guiding means are simply inserted in corresponding recesses in the tank without requiring any other holding or supporting means.

I claim:—

1. A film developing tank having recesses for receiving a film spool and a film cartridge, a film canal connecting said recesses and film cutting and film guiding means supported in said film canal in operative relation to the film passing from the said cartridge to the said spool.

2. A film developing tank having recesses for receiving a film spool and a film cartridge, a film canal connecting said recesses and film cutting and film guiding means supported in said film canal in operative relation to the film passing from the said cartridge to the said spool, a cover for closing said tank and a shaft for operating the said film guiding means extending through the said cover.

3. In combination a film developing tank, a film cartridge and a film spool therein, film cutting and guiding means, the said tank being provided with connecting recesses for detachably receiving all of the aforesaid elements.

4. In combination, a film developing tank having recesses for receiving a film cartridge and a film spool therein, said film spool including two opposed spirally grooved disks for receiving the film from the said cartridge, a hub connecting the disks and a cam on the hub for guiding the film into the grooves in the disks, a film canal connecting said recesses, film cutting and film guiding means in said film canal, a cover for said tank and a shaft for operating said film guiding means to guide the film from said film canal to the said hub.

CHRISTIAN LUZ.